Patented May 1, 1923.

1,453,515

UNITED STATES PATENT OFFICE.

PAUL I. MURRILL, OF PLAINFIELD, NEW JERSEY, ASSIGNOR TO R. T. VANDERBILT COMPANY, INC., OF NEW YORK, N. Y., A CORPORATION OF NEW YORK.

PROCESS OF MAKING VULCANIZATION ACCELERATORS.

No Drawing. Original application filed August 8, 1921, Serial No. 490,686. Divided and this application filed November 1, 1922. Serial No. 598,421.

*To all whom it may concern:*

Be it known that I, PAUL I. MURRILL, a citizen of the United States, residing in Plainfield, county of Union, State of New Jersey, have invented certain new and useful Improvements in the Processes of Making Vulcanization Accelerators.

The object of my invention is to produce accelerators of the type hereinafter referred to in large commercial quantities at a lower cost of manufacture than heretofore possible. Although the production of organic compounds for use as vulcanization accelerators has often been possible by laboratory methods to produce small quantities, yet the production in large quantities on a commercial scale has been very difficult and, therefore, has been an obstacle in the commercial use of such compounds as accelerators.

One vulcanization accelerator of the type above referred to is described and claimed in my prior application for Patent No. 1,436,894 issued November 28, 1922, for accelerators for vulcanizing rubber, of which application the present is a division, and this application is for the process of making said accelerator and similar organic compounds in commercial quantities.

The preferred method for producing my improved accelerator is as follows:

(a) Dimethylamine (four molecules) is condensed with carbon bisulphide (two molecules) in an aqueous solution, resulting in the dimethyl ammonium salt of dimethyl-dithio-carbamic acid.

(b) The aqueous solution containing this product is then treated with a solution of zinc sulphate, $ZnSO_4$ (one molecule), or other soluble salt of zinc, resulting in the precipitation from said solution of the insoluble zinc salt of dimethyldithio-carbamic acid.

(c) The insoluble zinc precipitate suspended in said aqueous solution is then oxidized at ordinary atmospheric temperatures, preferably below 20° C. with the equivalent of one atom of oxygen in the form of an aqueous solution of the desired oxidizing agent. This produces a substance which constitutes my improved accelerator.

Among the oxidizing agents which may be used for this purpose, I would mention halogens such as iodine, bromine, and chlorine, and their compounds, such as hypochlorites, also hydrogen peroxide, peroxides of metals, and per-sulphates and similar oxidizing agents.

The exact chemical composition of the resultant compound is not at present apparent, nor has any definite chemical name heretofore been applied to the substance which I have discovered. It is established, however, that the product is essentially different from the zinc salt of unoxidized dimethyl-dithio-carbamic acid, and also essentially different from the thiuram-disulphides which are obtained by oxidizing soluble salts of dimethyl-dithio-carbamic acid, both of which have already been used to some extent in the art as accelerators.

Having thus described this form of my invention, which I at present deem preferable, I do not wish to be understood as being limited to the specific proportions indicated or to any fixed proportions of ingredients, for various other proportions and other ingredients may be used in the manufacture and use of my improved accelerator. For instance, instead of salts of zinc, those of cadmium and other metals which give insoluble compounds with dialkyl-dithio-carbamic acids may be used.

I do not wish to be limited to compounds derived from dimethylamine, but consider dimethylamine as a type of secondary amines and wish to include derivatives of other secondary amines, either alkyl, mixed alkyl-aryl, or cyclic, such for instance as diethyl-amine, methylaniline and piperidine.

What I claim and desire to protect by Letters Patent is:

1. The process of making an oxidization product of a metallic salt of an organic acid, which comprises, condensing a secondary amine to form an ammonium salt of a disubstituted dithio-carbamic acid, precipitating the same to form a water insoluble precipitate thereof, and then oxidizing the precipitate.

2. The process of making an oxidization product of a metallic salt of an organic acid, which comprises, condensing a secondary amine to form an ammonium salt of a disubstituted dithio-carbamic acid, precipitating the same with a soluble metallic salt to form a water insoluble precipitate thereof, and then oxidizing the precipitate.

3. The process of making an oxidization product of a metallic salt of an organic acid, which comprises, condensing a secondary amine with carbon bisulphide, precipitating with a water soluble metallic salt to form an insoluble precipitate thereof, and then oxidizing the precipitate.

4. The process of making an oxidization product of a metallic salt of an organic acid, which comprises, condensing a secondary amine with carbon bisulphide, precipitating with a water soluble zinc salt to form an insoluble zinc salt thereof, and then oxidizing the precipitate.

5. The process of making an oxidization product of a metallic salt of an organic acid, which comprises, condensing dimethylamine with carbon bisulphide, precipitating with a water soluble zinc salt to form an insoluble zinc salt, and then oxidizing the precipitate.

6. The process of making an oxidization product of a metallic salt of an organic acid, which comprises, condensing dimethylamine with carbon bisulphide, precipitating with an aqueous solution of zinc sulphate to form an insoluble zinc salt, and then oxidizing the precipitate.

Signed October 30th, 1922.

PAUL I. MURRILL.